United States Patent
Itami et al.

(10) Patent No.: US 6,580,243 B2
(45) Date of Patent: Jun. 17, 2003

(54) OPENING/CLOSING CONTROL APPARATUS OF OPENING/CLOSING BODY FOR VEHICLE AND METHOD THEREOF

(75) Inventors: Eiji Itami, Chiryu (JP); Ryoichi Fukumoto, Nagoya (JP); Shintaro Suzuki, Kasugai (JP); Hiroyuki Yogo, Aichi-ken (JP); Masao Ohhashi, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/026,533

(22) Filed: Dec. 27, 2001

(65) Prior Publication Data

US 2002/0093301 A1 Jul. 18, 2002

(30) Foreign Application Priority Data

Dec. 27, 2000 (JP) ........................................ 2000-396732

(51) Int. Cl.⁷ ................................................ H02P 1/00
(52) U.S. Cl. ........................ 318/452; 318/445; 318/466; 318/468; 318/280; 318/282; 49/360; 49/362; 49/506
(58) Field of Search ................................ 318/445, 446, 318/449, 452, 453, 456, 468, 466, 280, 282, 286; 49/360, 362, 279, 506, 280

(56) References Cited

U.S. PATENT DOCUMENTS 5,723,960 A * 3/1998 Harada ........................ 318/469
5,770,934 A * 6/1998 Theile ......................... 318/469
6,081,088 A * 6/2000 Ishihara et al. ............. 318/466

FOREIGN PATENT DOCUMENTS

JP         9-125818 A     5/1997

* cited by examiner

Primary Examiner—Robert E. Nappi
Assistant Examiner—Rina I. Duda
(74) Attorney, Agent, or Firm—Burns, Doane, Swecker & Mathis, LP

(57) ABSTRACT

A door speed is detected at every predetermined detecting time, and a door position is calculated at a timing detected the door speed. A target speed according to the door position is obtained by a map. A microcomputer calculates a speed difference $\Delta VD$ between the target speed and the actual or present speed, and an acceleration/deceleration value $\Delta VC$ such as the speed difference between the door speed at the last detecting time and the present detecting time. A duty increasing value and the decreasing value of a PWM duty command value for adjusting a torque of the motor are set based on the speed difference $\Delta VD$ and the acceleration/deceleration value $\Delta VC$, the motor is driven by the PWM duty command value based on the duty increasing value and the decreasing value.

6 Claims, 13 Drawing Sheets

OPENING/CLOSING CONTROL APPARATUS
OF OPENING/CLOSING BODY FOR
VEHICLE AND METHOD THEREOF

This application is based on and claims priority under 35 U.S.C. §119 with respect to Japanese Application No. 2000-396732 filed on Dec. 27, 2000, the entire content of which is incorporated herein by reference.

FIELD OF THE INVENTION

This invention generally relates to an opening/closing apparatus of an opening/closing body for a vehicle and a method for opening/closing such a body. More particularly, this invention relates to an opening/closing control apparatus and an opening/closing control method of a slide door driven by a motor installed on a side of the vehicle.

BACKGROUND OF THE INVENTION

One example of an opening/closing control apparatus, such as a speed control apparatus, of an opening/closing body is known from Japanese Patent Laid-Open Publication No. 9(1997)-125818. In the speed control apparatus of the opening/closing body, the moving speed of the slide door is detected intermittently. A controller judges whether the detected value is greater than an upper limit to be set for a target speed or whether the detected value is less than a lower limit (condition 1). When condition 1 is repeated two times, the controller detects an adaptation difference in which the moving speed is too fast or too late, and the controller adjusts an adjustment amount by which the target speed changes based on the adaptation difference. Further, the moving speed of the slide door based on the adjustment amount is detected, the adjustment amount is adjusted again. Therefore, the adaptation difference for the target speed of the slide door is reliably detected. Thereby, even if gravity acts on the slide door on a sloping road, for example, the moving speed is controlled with respect to the target speed.

However, in the speed control apparatus of the opening/closing body in the above-mentioned published application, because the adjustment amount for changing the target speed is adjusted based on only the present speed of the opening/closing body, an opening/closing body having a large inertia weight such as a slide door of a vehicle is difficult to control with a small delay for the target speed. Particularly when the target speed changes according to an opening/closing position of the slide door and the sliding resistance fluctuates, the door speed is difficult to control with a small delay for the target speed as the speed changing pattern of the opening/closing body changes for the same adjustment amount.

A need exists for a way of controlling the speed of an opening/closing body for the target speed with a small delay even if a load acting on the opening/closing body or the target speed is changed by changing of the position of the opening/closing body with an opening/closing control apparatus and method of the opening/closing body for a vehicle, of which an opening/closing speed of the opening/closing body is controlled for the target speed according to on the position of the opening/closing body.

SUMMARY OF THE INVENTION

One aspect of the invention involves an opening/closing control method of an opening/closing body for a vehicle including detecting a position of the opening/closing body within an opening/closing area moving the opening/closing body and a motion speed of the opening/closing body at the position of the opening/closing body, obtaining a predetermined target speed of the opening/closing body at the position of the opening/closing body, controlling a feeding value for a motor moving the opening/closing body based on the motion speed and the target speed, driving the motor by a torque depend on the feeding amount includes steps of calculating a speed difference between the motion speed and the target speed for the position of the opening/closing body at every detecting time of the motion speed, calculating an acceleration/deceleration value such as a speed difference between a last detected motion speed and a present detected motion speed, setting a feeding amount increasing/decreasing value for changing the torque of the motor based on at least the speed difference and the acceleration/deceleration value, and controlling the motor by a torque depending on one of a feeding value added a last obtained feeding value to the feeding amount increasing/decreasing value and a feeding value subtracted the feeding amount increasing/decreasing value from the last obtained feeding value.

The feeding amount is determined based on the speed difference between the target speed and motion speed of the opening/closing body when the motion speed is detected and on the acceleration/deceleration value such as the speed difference between the last detected motion speed and the present detected motion speed, and the motor torque is adjusted by the feeding amount. Therefore, even if the load acting on the opening/closing body changed by opening/closing of the opening/closing body, or the target speed is set so as to be change according to the position of the opening/closing body, the speed of the opening/closing body is controlled for the target speed at the position of the opening/closing body within small delay.

According to another aspect of the invention, an opening/closing control apparatus of an opening/closing body for a vehicle includes motor operating means for operating a motor driving the opening/closing body by a torque depending on a feeding amount, position detecting means for detecting a position of the opening/closing body within a opening/closing area moving of the opening/closing body, target speed memory means for memorizing a target speed of the opening/closing body to be set at the position of the opening/closing body within the opening/closing area, motion speed detecting means for detecting a motion speed of the opening/closing body, speed difference obtaining means for calculating the target speed at the position of the opening/closing body and the motion speed at every detecting time of the motion speed, acceleration/deceleration value obtaining means for calculating the acceleration/deceleration value such as a speed difference between the last detected motion speed and the present detected motion speed, feeding increasing/decreasing value setting means for setting a feeding increasing/decreasing value changing the torque of the motor based on the speed difference and the acceleration/deceleration value, and motor control means for controlling the motor by one of a feeding value added the last obtained feeding value to the feeding increasing/decreasing value and a feeding value subtracted the feeding increasing/decreasing value from the last obtained feeding value.

The torque of the motor is determined by controlling a feeding value based on the speed difference between the target speed at the position of the opening/closing body and motion speed and the acceleration/deceleration value such as the speed difference between the last detected motion speed and the present detected motion speed. Therefore, even if the load acting on the opening/closing body changed by moving of the opening/closing body, or the target speed is set so as to be changed according to the position of the opening/closing body, the speed of the opening/closing body is controlled for the target speed at the position of the opening/closing body within small delay.

The opening/closing control apparatus further includes moving direction detecting means for detecting a moving direction of the opening/closing body, the feeding increasing/decreasing value setting means sets the feeding increasing/decreasing value based on the speed difference, the acceleration/deceleration value, and the motion direction when the positions of the opening/closing body is in an acceleration/deceleration area where the target speed is increased/decreased depending on a change of the position of the opening/closing body. When the target speed is in the acceleration/deceleration area where the target speed depending on the position of the opening/closing body increases or decreases, the feeding increasing/decreasing value is set based on the moving direction according to the changing of the target speed. Therefore, when the target speed increases by the motion of opening/closing body, the increasing value of the feeding increasing/decreasing value is larger than the decreasing thereof, thereby the speed of the opening/closing body is controlled so as not to large apart from the target speed. Further, when the target speed decreases, the decreasing value of the feeding increasing/decreasing value is larger than the increasing value thereof, thereby the speed of the opening/closing body is controlled so as not to large apart from the target speed. Accordingly, in the acceleration/deceleration area changing the target speed, the speed of the opening/closing body is controlled for the target speed at the position of the opening/closing body within small delay. Furthermore, when the speed of the opening/closing speed dropped from the target speed by entrapment of the obstacle etc., a large load by the motion of the opening/closing body does not act on the object, as the feeding amount does not increase rapidly.

The feeding increasing/decreasing value setting means sets an increasing value from a sum of plural feeding increasing/decreasing values to be predetermined set in the acceleration/deceleration area when the moving direction of the opening/closing body is a direction increasing the target speed in the acceleration/deceleration area, and sets an decreasing value from a sum of plural feeding increasing/decreasing values to be predetermined set in the acceleration/deceleration area when the moving direction of the opening/closing body is a direction decreasing the target speed in the acceleration/deceleration area. When the opening/closing body moves in a direction increasing the target speed, the sum of plural times of the feeding increasing/decreasing values to be predetermined set in the acceleration/deceleration area is set as the increasing value, and when the motion of the opening/closing body is the direction decreasing the target speed, the speed of the opening/closing body is controlled so as not to large apart from the target speed. Accordingly, in the acceleration/deceleration area changing the target speed, the speed of the opening/closing body is controlled by a small delay for the target speed at the position of the opening/closing body.

The feeding increasing/decreasing value setting means sets from each sum of the increasing value and the decreasing value of plural feeding increasing/decreasing values to be predetermined set in a large load area is larger than each sum of the increasing value and the decreasing value of plural feeding increasing/decreasing values to be predetermined set in an area except the large load area when the position of the opening/closing body is in a large load area where a load resistance by a moving of the opening/closing body is large. In the large load area where the load resistance acting on the opening/closing body is large, the amount by which the speed of the opening/closing body changes for the target speed is larger than the amount which the speed thereof in the area except the large load area. Accordingly, even if the load resistance according to the change of the position of the opening/closing body changes, the speed of the opening/closing body is controlled by a small delay for the target speed in all of the opening/closing area.

The opening/closing control apparatus can further include overload detecting means for detecting whether the load resistance acting on the opening/closing body is more than a predetermined load judging value, and reverse control means for controlling the motor by a predetermined overload feeding amount when the load resistance is more than the load judging value, and moving the opening/closing body in a reverse direction. When the large load such as the overload acts on the opening/closing body during the motion of the opening/closing body, the opening/closing body is driven in the reverse direction by the speed of the opening/closing body according to the overload-feeding amount to be predetermined, set. Accordingly, for example, as the overload feeding amount is set as the maximum feeding amount for the motor, the time when the load by the opening/closing body acts on the object can be short.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 2:
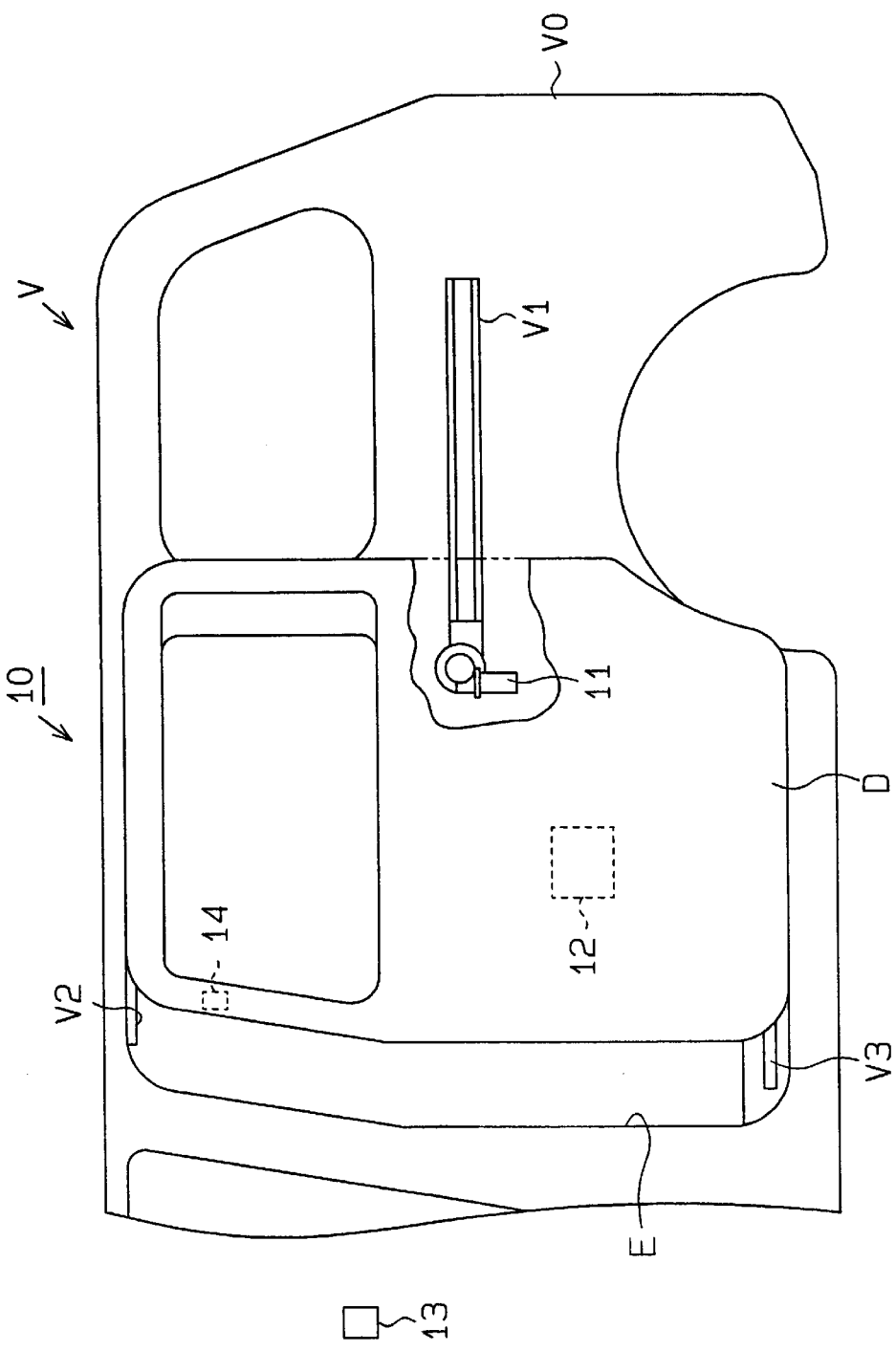
FIG. 2 is a side view of a vehicle illustrating the power door opening/closing control apparatus mounted with respect to the side door of vehicle.

The present invention is applicable to a power door opening/closing apparatus for automatically controlling the opening/closing movement of an opening/closing body (e.g., slide door) mounted on a vehicle. Referring initially to FIG. 2, a power door opening/closing apparatus 10 serves as an opening/closing control apparatus of an opening/closing body to automatically move a slide door D for exposing and covering the opening E formed at a side portion of the vehicle. The power door opening/closing apparatus 10 includes a driving unit 11, an electronic control unit (ECU) 12, an opening/closing switch 13, and a courtesy switch 14.

The slide door D is supported on the vehicle body V0 by a center guide rail V1 disposed at the rear side portion of the vehicle body V0, an upper guide rail V2 disposed at the upper side portion of the opening E, and a lower guide rail V3 disposed at the lower side portion of the opening E. The slide door D is adapted to move in the front/rear direction of the vehicle. The slide door D moves from a full close position under a full closed condition to a full open position under a full open condition. When the slide door D performs an opening movement from the full close position, at first, after the slide door D moves out of the opening E to an outside of the vehicle, the slide door D is guided rearward in a straight manner to the full open position.

The driving unit 11 and the ECU 12 are disposed in an inner portion of the slide door D. The opening/closing switch 13 is disposed adjacent the driver's seat and is adapted to be operated by the driver. The courtesy switch 14 is disposed in the slide door D and is adapted to detect the full close condition of the slide door D.

Figure 3:
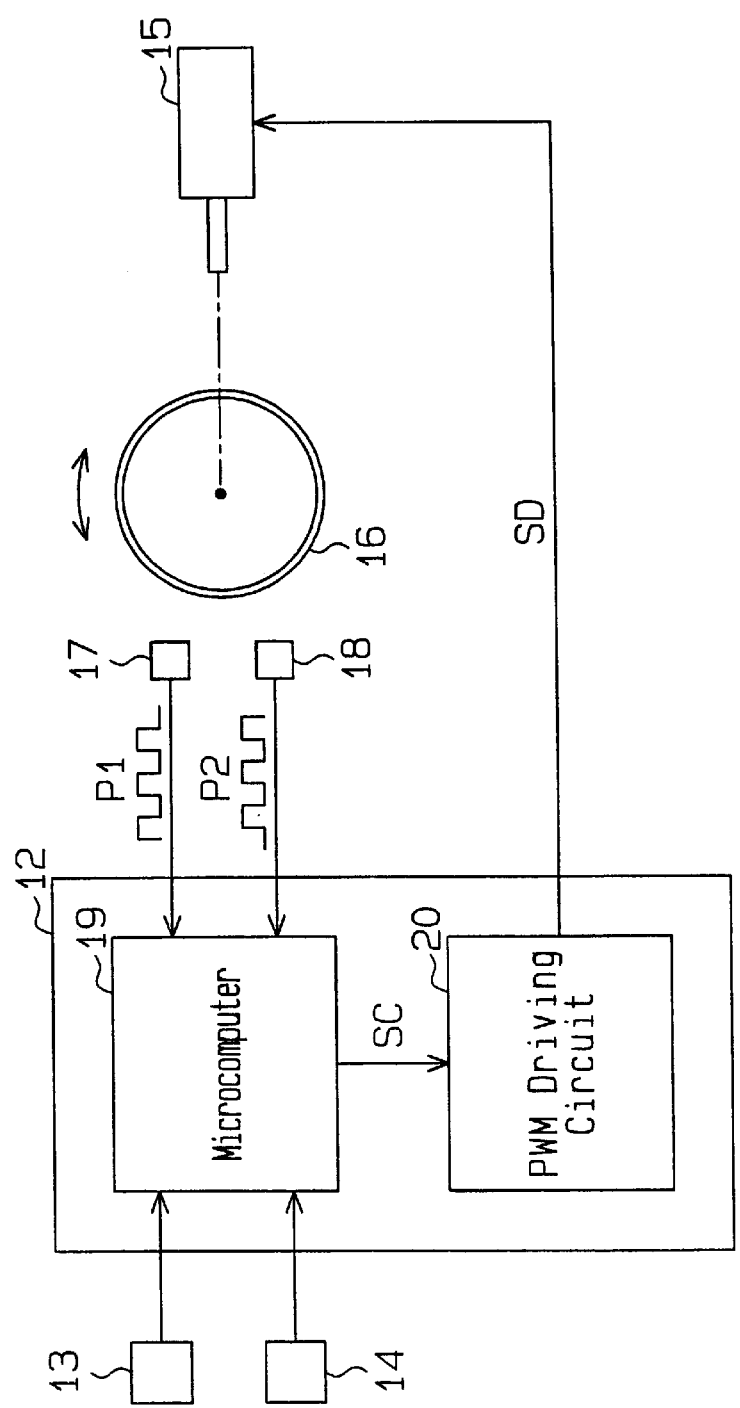
FIG. 3 is a block diagram showing the electrical construction of a rotational position detecting mechanism.

The driving unit 11 consists of a well-known construction, including a motor such as a DC motor 15 shown in FIG. 3. The driving unit 11 also includes a deceleration gear mechanism, a rotational position detecting mechanism, a wire drum, and a wire. The motor 15 rotates in a clockwise or a counter clockwise direction. The motor 15 drives the wire drum in the clockwise direction or the counter clockwise direction via the deceleration mechanism. One end of a first wire is fixed with a rear end of the center guide rail VI, and the other end is wound around the wire drum. In a similar manner, one end of a second wire is fixed with a front end of the center guide rail VI, and the end is wound around the wire drum. When the wire drum rotates in a normal rotation or the normal direction, the first wire is wound and the second wire is paid out. On the other hand, when the wire drum rotates in a reverse rotation or the reverse direction, the first wire is paid out and the second wire is wound. Further, when the motor 15 is driven in the normal rotation or normal direction, the driving unit 11 causes the slide door D to move from the close condition to the open condition. On the other hand, when the motor 15 is driven in the reverse rotation or reverse direction, the motor 15 causes the slide door D to move from the open condition to the close condition.

The rotational position detecting mechanism is of a well-known construction. As shown in FIG. 3, the rotational position detecting mechanism includes a ring magnet 16 rotationally driven by the motor 15, a first Hall IC 17 and a second Hall IC 18 fixed with a housing so as to oppose the outer peripheral surface of the ring magnet 16. Magnetic fields separated at equal angular intervals in the circumferential direction are formed on the outer peripheral surface of the ring magnet 16, with each magnetic field being magnetized to switch the magnetization direction alternately in the circumferential direction. Each Hall IC 17, 18 detects each magnetization field according to the rotation of the ring magnet 16, with each Hall IC 17, 18 outputting pulse signals P1, P2 of a pulse cycle in proportion to the rotational speed of the ring magnet 16 (i.e., the rotational speed of the motor 15).

The electrical construction of the power door opening/closing apparatus 10 is as follows. Each Hall IC 17, 18 outputs respective pulse signals P1, P2, with the Hall IC 17 and the Hall IC 18 being disposed to produce a phase difference between the pulse signal P1 and the pulse signal P2 of 180°. When the motor 15 rotates in the normal rotation, the pulse signal P2 generated by the Hall IC 18 is a high voltage and the pulse signal P1 generated by the first Hall IC 17 changes from a high voltage to a low voltage. To the contrary, when the motor 15 rotates in the reverse rotation, the pulse signal P2 generates a low voltage by the second Hall IC 18 while the pulse signal P1 generated by the first Hall IC 17 changes from a high voltage to a low voltage.

The opening/closing switch 13 has three positions, namely an OFF position, an open position, and a close position. The opening/closing switch 13 is operated to one of the open position and the close position from the OFF position. When the opening/closing switch 13 is operated from the OFF position to the open position, the opening/closing switch 13 supplies a switch signal to the ECU 12 to cause the slide door D to slide from the full close position toward the full open position. Further, when the opening/closing switch 13 is operated from the OFF position to the close position, the opening/closing switch 13 supplies a switch signal to the ECU 12 to cause the slide door D to move from the full open position toward the full close position under a closing motion.

The courtesy switch 14 is in the OFF condition when the slide door D reaches the full close position. When the position of the slide door D is not the full close position, the condition of the courtesy switch 14 is the ON condition. The signal of the courtesy switch 14 is inputted to the ECU 12.

The ECU 12 drives the driving unit 11 when the opening/closing switch 13 is changed from the OFF position to the close position, with the ECU 12 automatically moving the slide door D from the full open position to the full close position. Further, when the opening/closing switch 13 is operated from the OFF position to the open position, the ECU 12 automatically moves the slide door D from the full close position to the full open position.

As shown in FIG. 3, the ECU 12 comprises a microcomputer 19 and a PWM (Pulse Width Modulation) driving circuit 20. In this embodiment, the first Hall IC 17, the second Hall IC 18, and the microcomputer 19 correspond to or constitute a position detecting means, a motion speed detecting means, a motion direction detecting means, and an overload detecting means. Further, the microcomputer 19 constitutes a target speed memory means, a difference speed obtaining means, an acceleration/deceleration value obtaining means, a feeding increasing/decreasing value setting means, a motor control means, and a reverse control means. The PWM driving circuit 20 corresponds to or constitutes a motor driving means.

The microcomputer 19 operates according to a control program memorized in a memory. The microcomputer 19 controls the motor 15 based on signals from the opening/closing switch 13, the courtesy switch 14 and the Hall ICs 17, 18 so that the slide door D (opening/closing body) is automatically moved. The microcomputer 19 outputs a PWM duty command value, updated periodically, to a PWM driving circuit 20, whereby the motor 15 is driven in the normal rotation or the reverse rotation by the PWM duty command value.

The PWM driving circuit 20 is of a well-known construction. The PWM driving circuit 20 outputs a PWM driving signal SD including a rotational direction and a PWM duty value indicated by a PWM duty command signal SC for the motor 15. The motor 15 is driven in one of the normal and reverse directions by the indicated rotational direction and the PWM duty value included in the PWM duty command signal SC.

Automatic Opening/Closing Control Process

The automatic opening/closing control program comprises an automatic opening/closing control process performed in a main routine and a door position/speed detecting process performed in an interrupt routine. The main routine is repeated at a predetermined time interval such as a detecting time T (e.g., 2 msec). The interrupt routine is performed when the pulse signal P1 outputted by the first Hall IC 17 changes from a high electric potential (Hi) to a low electric potential (Low), or when the pulse signal P1 changes from the low electric potential (Low) to the high electric potential (Hi).

Main Routine

Figure 4:
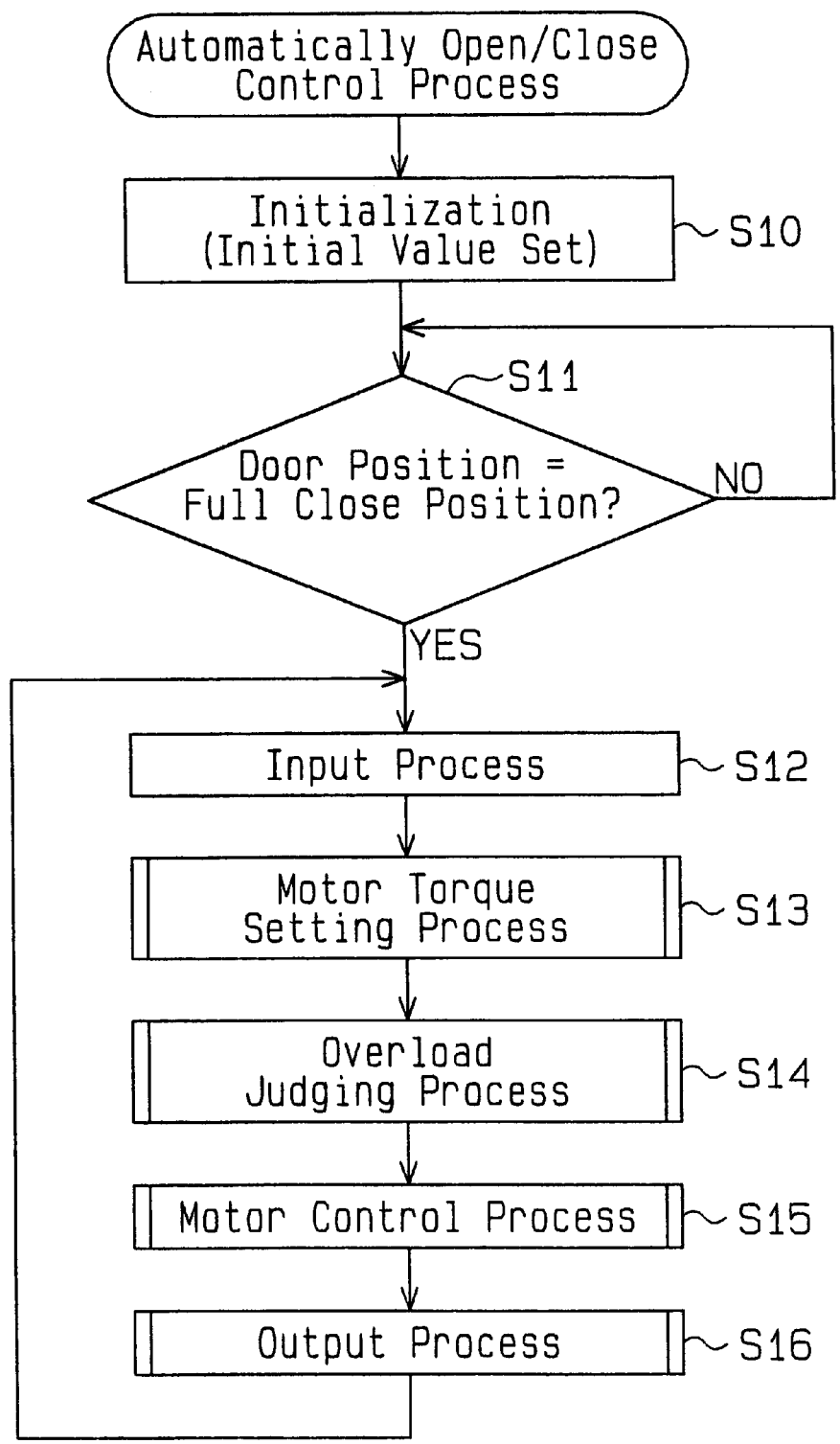
FIG. 4 is a flowchart of the automatic opening/closing control process.

As shown in FIG. 4, the automatic opening/closing control process involves the microcomputer 19 first performing an initialization of data at step S10. Next, at step S11, the microcomputer 19 judges whether or not the slide door D is at the full close position based on the switch condition of the courtesy switch 14. When it is determined that the slide door D is not at the full close position, the program repeatedly executed step S11 to wait until the slide door D is driven or moved to the full close position.

When it is determined at step S11 that the slide door D is at the full close position, the microcomputer 19 performs an input process for inputting a switch condition of the opening/closing switch 13 at step S12. Next, the microcomputer 19 performs a motor torque setting process at step S13. At step S13, the microcomputer 19 changes the PWM duty command value according to a door speed of the slide door D (opening/closing body) so that the slide door D is driven so as to control the opening/closing speed to a target speed based on the slide door position.

At step S14, the microcomputer 19 continuously executes an overload judging process. In the overload judging process, the microcomputer 19 detects an overload acting on the slide door D by, for example, entrapment of an object during the movement of the slide door D.

Next, the microcomputer 19 executes a motor control process at step S15. In the motor control process, the slide door D is driven by the PWM duty command value to be set in the motor torque setting process based on the switch operation of the opening/closing switch 13, when the overload is detected by the overload judging process, the slide door D is driven in the reverse direction.

At last, at step S16, the microcomputer 19 executes an output process outputting the PWM duty command signal so as to command the motor torque and the rotational direction for the PWM driving circuit 20.

Door Position/Speed Detecting Process

Figure 5:
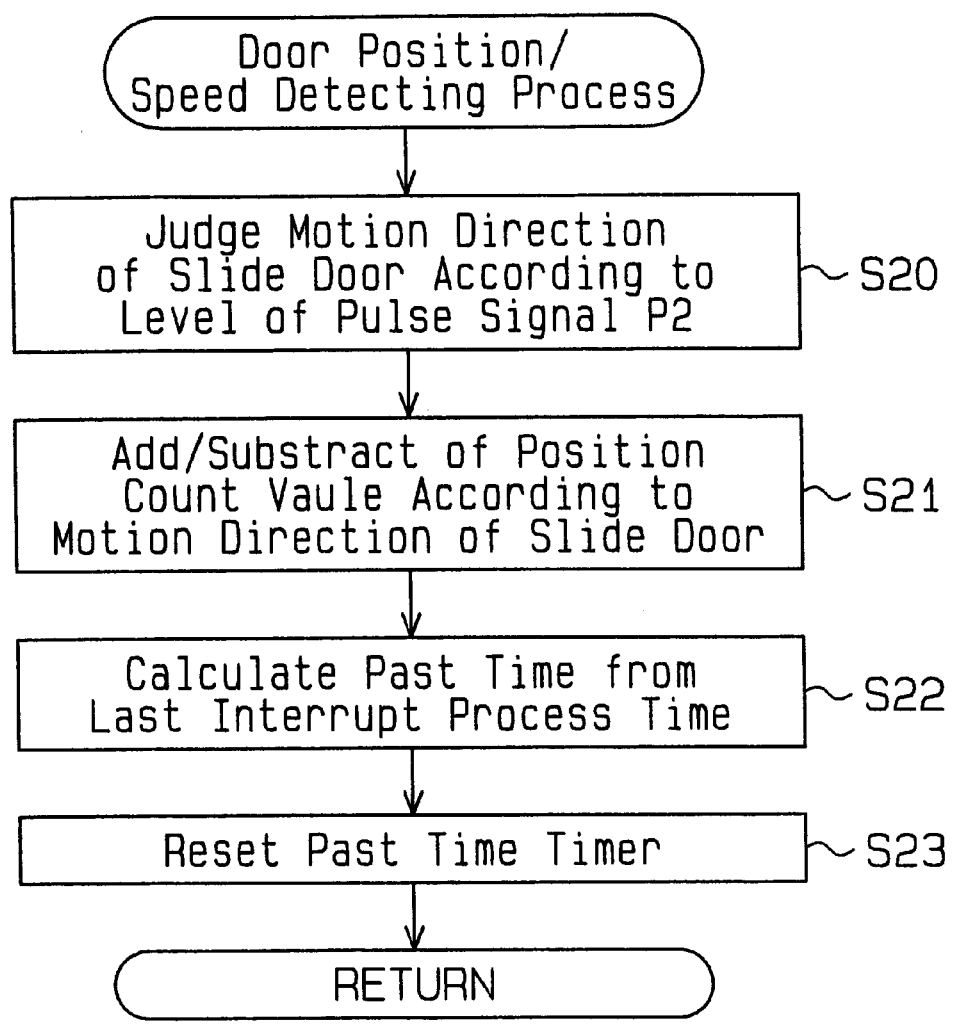
FIG. 5 is a flowchart of the door position/speed detecting process.

As shown in FIG. 5, in the door position/speed detecting process executed by the interrupt routine, at first the microcomputer 19 judges at step S20 whether the slide door D is being driven under an open motion or a close motion based on the level of the pulse signal P2 when the pulse signal P1 changes from the high electric potential to the low electric potential, or the level of the pulse signal P2 when the pulse signal P1 changes from the low electric potential to the high electric potential. Next, at step S21, the microcomputer 19 executes an addition or subtraction for a position counter based on the judged moving direction of the slide door D, with the full close position being set as a standard position and a position count value being calculated according to the door position. For example, the position counter is incremented under the door open motion while the position counter is decremented under the door close motion.

Next, at step S22, a past time from the last interrupt process timing to the present interrupt process timing is obtained by a past time timer. Then, after the past time timer is reset at S23, the door position/speed detecting process is finished.

Motor Torque Setting Process

Figure 1:
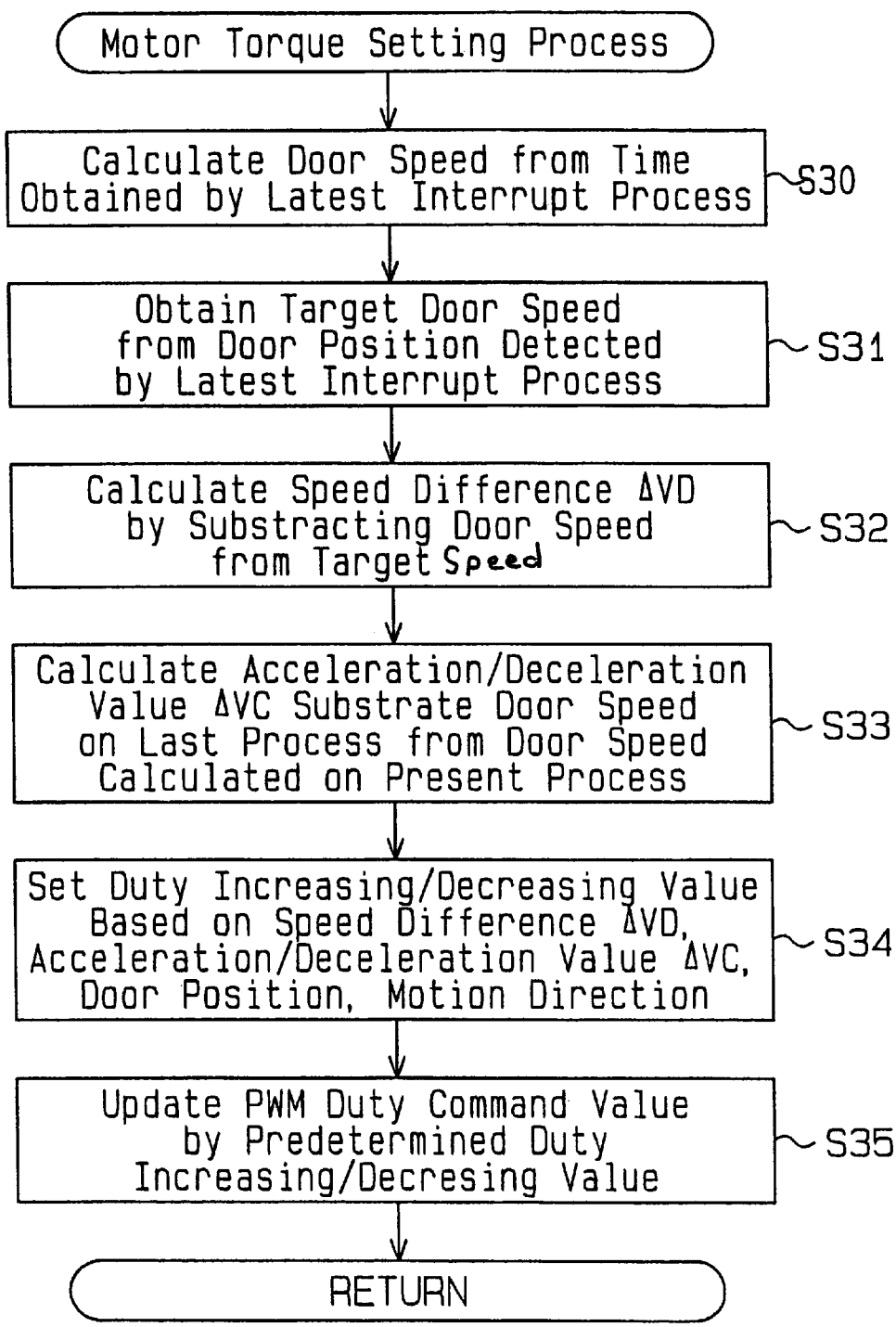
FIG. 1 is a flowchart showing the motor torque setting process used in an automatically opening/closing control apparatus such as a power door opening/closing control apparatus according to an embodiment of a present invention.
Figure 7:
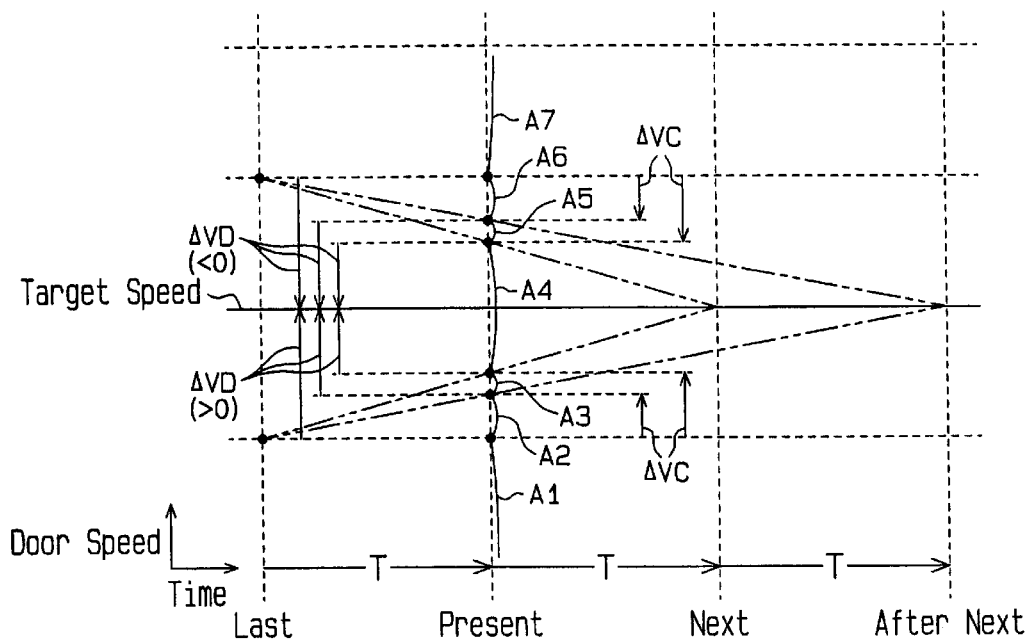
FIG. 7 is an explanatory view showing the relationship between the speed differences, speed changing amount, and increasing/decreasing value in a constant speed area of the opening/closing body.

FIG. 1 illustrates the motor torque setting process executed in the automatic opening/closing control process. Initially, at step S30, the microcomputer 19 calculates the latest door speed based on the past time obtained by the door position/speed detecting process executed by the latest interrupt process. Further, when the door position/speed detecting process was not carried out between the last process timing of the automatic opening/closing control process and the present process timing, the present door speed is set by the door speed calculated by the last process. Next, at step S31 the door position based on the position count value is detected by the position count value in the latest door position/speed detecting process, and a target speed to be set for the detected door position is obtained from a predetermined map. As shown in FIG. 7, a speed difference $\Delta VD$ is continuously calculated by subtracting the actual door speed calculated in the present process from the target speed obtained from the map.

Next, in step S33, an acceleration/deceleration value $\Delta VC$ is calculated by subtracting the actual door speed calculated in the last process from the actual door speed calculated in the present process. The acceleration/deceleration value $\Delta VC$ is the changing amount of the door speed at every detecting time T (a time between the last process and the present process). The acceleration/deceleration value $\Delta VC$ reflects the door speed on the last process, the inertia mass of the slide door D, the PWM duty command value of the motor to be set on the last process, and the magnitude of a sliding resistance in the moving range of the slide door D from the last process to the present process.

Next, at step S34, a duty increasing value and a duty decreasing value such as a feeding increase/decrease value are selected from data including a predetermined duty increasing value/duty decreasing value based on the calculated speed difference $\Delta VD$, the calculated acceleration/deceleration value $\Delta VC$, the door position, and the moving direction. The duty increasing value (increasing value) is an increased value of the PWM duty command value to increase the torque of the motor 15, and the duty decreasing value (decreasing value) is a decreased value of the PWM duty command value to decrease the torque of the motor. At the next process timing past the detecting time T from the present process timing, the increasing value and the decreasing value are adjusted to change the amount of the motor torque so that the actual door speed approaches the target speed for the door position at the next process timing. At step S35, a new or updated PWM duty command value is set, instead of the PWM duty command value set on the last process, by adding the increasing value to or subtracting the decreasing value from the PWM duty command value predetermined in the last process.

Map for Setting Target Speed

The target speed used in the motor torque setting process is set for the door position within the opening/closing range of the slide door D. The target speed improves the motion of the slide door D on the opening/closing motion. The target speed is set so that a relatively small load is applied by the slide door D in the event an object becomes entrapped.

Figure 6:
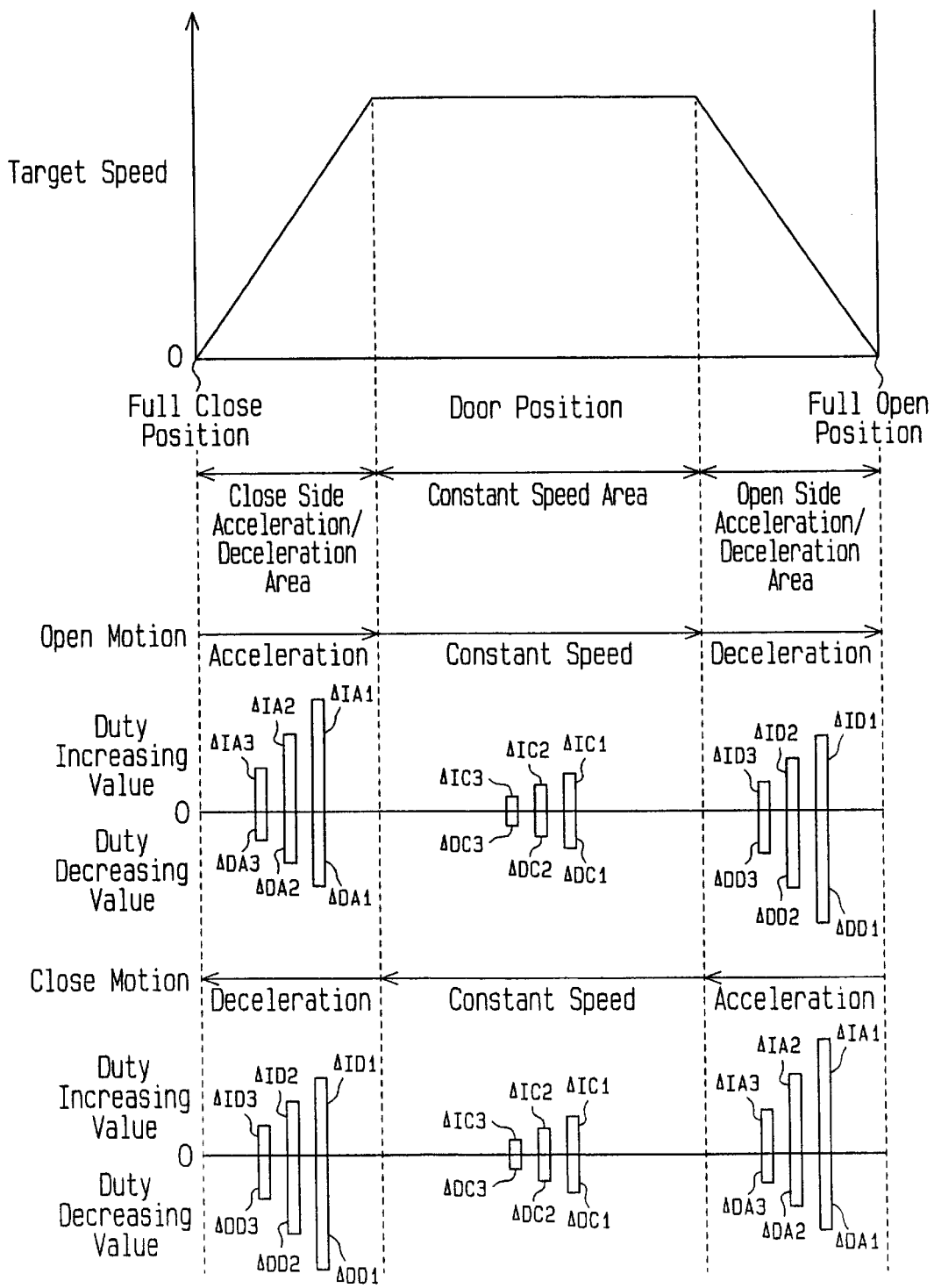
FIG. 6 is a map showing the relationship between the target speed and door position, and an explanatory illustration showing increasing values and decreasing values for various areas such as the close side acceleration/deceleration area, the constant speed area, and the open side acceleration/deceleration area.

As shown in FIG. 6, the opening/closing range comprises a close side acceleration/deceleration area including the full close position, an open side acceleration/deceleration area including the full open position, and a constant speed area between the two acceleration/deceleration areas. The close side acceleration/deceleration area is a motion domain or region in which the door position is moved a predetermined distance in a rear direction of the vehicle after the slide door D positioned within the opening moves from the full close position in a width direction of the vehicle. The open side acceleration/deceleration area is a motion domain or region until the door position where the slide door D is moved a predetermined distance. Further, the constant speed area is a motion area between the close side acceleration/deceleration area and the open side acceleration/deceleration area.

For the close side acceleration/deceleration area, the target speed is nearly "0" at the full close position and the target speed increases linearly from the full close position to a boundary position of the constant speed area. For the constant speed area, the target speed is a maximum value of the close side acceleration/deceleration area and the constant target speed is set at a value such as the maximum door speed of the slide door D. For the open side acceleration/deceleration area, the target speed decreases linearly from a boundary position of the constant speed area to the full open position, with the target speed being set nearly to "0" at the full open position.

Duty Increasing Value/Decreasing Value

As shown in FIG. 6, the increasing value and the decreasing value to be set in the motor torque process are set at a plurality of different values for each area within the opening/closing range.

Constant Speed Area

As shown in FIG. 6, for the constant speed area, three different increasing values $\Delta IC1$, $\Delta IC2$, $\Delta IC3$ for increasing the motor torque are set, and three different decreasing values $\Delta DC1$, $\Delta DC2$, $\Delta DC3$ for decreasing the motor torque are set. The three increasing values for increasing the motor torque are positive value respectively, with the three increasing values corresponding to the constant increasing values $\Delta IC1$, $\Delta IC2$, $\Delta IC3$ respectively. On the other hand, the three decreasing values for decreasing the motor torque are negative values respectively, with the three decreasing values corresponding to the constant decreasing values $\Delta DC1$, $\Delta DC2$, $\Delta DC3$. The constant increasing values $\Delta IC1$, $\Delta IC2$, $\Delta IC3$ and the constant decreasing values $\Delta DC1$, $\Delta DC2$, $\Delta DC3$ may or may not be the same values when the slide door D is moving under the open motion and is moving under the close motion.

The constant increasing value $\Delta IC1$ is a set value which is greater than the constant increasing value $\Delta IC2$, while the constant increasing value $\Delta IC2$ is a set value which is greater than the constant increasing value $\Delta IC3$. Also, the constant decreasing value $\Delta DC1$ is less than the constant decreasing value $\Delta DC2$, while the constant decreasing value $\Delta DC2$ is less than the constant decreasing value $\Delta DC3$. Further, the constant increasing value $\Delta IC1$ and the constant decreasing value $\Delta DC1$, the constant increasing value $\Delta IC2$ and the constant decreasing value $\Delta DC2$, and the constant increasing value $\Delta IC3$ and the constant decreasing value $\Delta DC3$ are set as the same value (absolute value).

Increasing Value/Decreasing Value in Constant Speed Area

[$\Delta IC1$]

As shown in FIG. 7, when the speed difference $\Delta VD$ is a positive value, and the door speed is in an area A1 in which the calculated acceleration/deceleration value $\Delta VC$ is less than "0", the increasing value $\Delta IC1$ in the constant speed area is used. The increasing value $\Delta IC1$ in the constant speed area is set such that the speed difference between the target door speed and the actual door speed at the next process timing is smaller than the speed difference between the target door speed and the actual door speed at the present time.

[$\Delta IC2$]

As shown in FIG. 7, when the speed difference $\Delta VD$ is a positive value, and two times the calculated acceleration/deceleration value $\Delta VC$ is less than the speed difference $\Delta VD$ between the target speed and the door speed (i.e., ($2\Delta VC<\Delta VD$), and the door speed is in the area A2 in which the acceleration/deceleration value $\Delta VC$ is larger than "0", the increasing value $\Delta IC2$ in the constant speed area is used. The increasing value $\Delta IC2$ in the constant speed area is set such that the speed difference between the target door speed and the actual door speed at the next process timing is smaller than the speed difference between the target door speed and the actual door speed at the present time.

[$\Delta IC3$]

As shown in FIG. 7, when the speed difference $\Delta VD$ is a positive value, and the calculated acceleration/deceleration value $\Delta VC$ is less than the speed difference $\Delta VD$ between the target door speed and the actual door speed (i.e., $\Delta VC<\Delta VD$), and the door speed is in the area A3 in which two times the acceleration/deceleration value $\Delta VC$ is larger than the speed difference $\Delta VD$ (i.e., $2\Delta VC>\Delta VD$), the increasing value $\Delta IC3$ in the constant speed area is used. The increasing value $\Delta IC3$ in the constant speed area is set such that the actual door speed at the next process timing is less than the target door speed at the next process timing.

Further, when the speed difference $\Delta VD$ is a positive value, the calculated acceleration/deceleration value $\Delta VC$ is larger than the speed difference. $\Delta VD$, or when the speed difference $\Delta VD$ is the negative value and the door speed is in the area A4 in which the calculated acceleration/deceleration value $\Delta VC$ is less than the speed difference $\Delta VD$, the PWM duty command value set at the last process timing is maintained.

[$\Delta DC3$]

As shown in FIG. 7, when the speed difference $\Delta VD$ is a negative value and the calculated acceleration/deceleration value $\Delta VC$ is larger than the speed difference $\Delta VD$, and the door speed is in the area A5 in which two times the acceleration/deceleration value $\Delta VC$ is less than the speed difference $\Delta VD$ (i.e., $2\Delta VC<\Delta VD$), the decreasing value $\Delta DC3$ in the constant speed area is used. The decreasing value $\Delta DC3$ in the constant speed area is set to decrease the door speed at the next process timing below the target door speed at the next process timing and so as not to decrease the actual door speed at the next process timing below the target door speed at the next process timing.

[ΔDC2]

When the speed difference ΔVD is a negative value, and two times the calculated acceleration/deceleration value ΔVC is larger than the speed difference ΔVD, and the door speed is in the area A6 in which the acceleration/deceleration value ΔVC is less than "0", the decreasing value ΔDC2 in the constant speed area is used. The decreasing value ΔDC2 in the constant speed area is set such that the speed difference between the target door speed and the actual door speed at the next process timing is less than the speed difference between the target speed and the actual door speed at the present time.

[ΔDC1]

When the speed difference ΔVD is the negative value, the door speed is at the area A7 in which the acceleration/deceleration value ΔVC is more than "0", the decreasing value ΔDC1 in the constant speed area is used. The decreasing value ΔDC1 in the constant speed area is set such that the speed difference between the target door speed and the actual door speed at the next process timing is smaller than the speed difference between the target door speed and the actual door speed at the present time.

Close Side Acceleration/Deceleration Area

As shown in FIG. 6, for the close side acceleration/deceleration area, three increasing values ΔIA1, ΔIA2, ΔIA3 and three decreasing values ΔDA1, ΔDA2, ΔDA3 used for the open motion of the slide door D are set, and three increasing values ΔID1, ΔID2, ΔID3 and three decreasing values ΔDD1, ΔDD2, ΔDD3 used for the close motion of the slide door D are set. The above mentioned values differ from each other.

Acceleration

The three increasing values used for the acceleration under the open motion are the acceleration increasing values ΔIA1, ΔIA2, ΔIA3, and the three decreasing values are the acceleration decreasing value ΔDA1, ΔDA2, ΔDA3. Each acceleration increasing value ΔIA1, ΔIA2, ΔIA3 is an addition value of the PWM duty command value so as to increase the motor torque, and each acceleration decreasing value ΔDA1, ΔDA2, ΔDA3 is a deceleration value of the PWM duty command value so as to decrease the motor torque.

The acceleration increasing value ΔIA1 is greater than the acceleration increasing value ΔIA2, and the acceleration increasing value ΔIA2 is greater than the acceleration increasing value ΔIA3. Also, the acceleration decreasing value ΔDA1 is less than the acceleration decreasing value ΔDA2 (i.e., the absolute value of the acceleration decreasing value ΔDA1 is greater than the absolute value of the acceleration decreasing value ΔDA2), and the acceleration decreasing value ΔDA2 is less than the acceleration decreasing value ΔDA3. That is, if ΔDA3, ΔDA2, ΔDA1 are negative values, the relationship between ΔDA3, ΔDA2, ΔDA1 is |ΔDA3|<|ΔDA2|<|ΔDA1|.

In addition, the absolute value of the acceleration decreasing value ΔDA1 is greater than an absolute value of the decreasing value ΔDC1 in the constant speed area, and the absolute value of the acceleration decreasing value ΔDA2 is greater than the absolute value of the decreasing value ΔDC2 in the constant speed area. Similarly, the absolute value of the acceleration decreasing value ΔDA3 is greater than the absolute value of the acceleration decreasing value ΔDC3 in the constant speed area.

Further, the absolute value of the acceleration increasing value ΔIA1 is greater than the absolute value of the acceleration decreasing value ΔDA1, and the absolute value of the acceleration increasing value ΔIA2 is greater than the absolute value of the acceleration decreasing value ΔDA2. Similarly, the absolute value of the acceleration increasing value ΔIA3 is greater than the absolute value of the acceleration decreasing value ΔDA3.

Increasing Value/Decreasing Value Under Acceleration

[ΔIA1]

Figure 8:
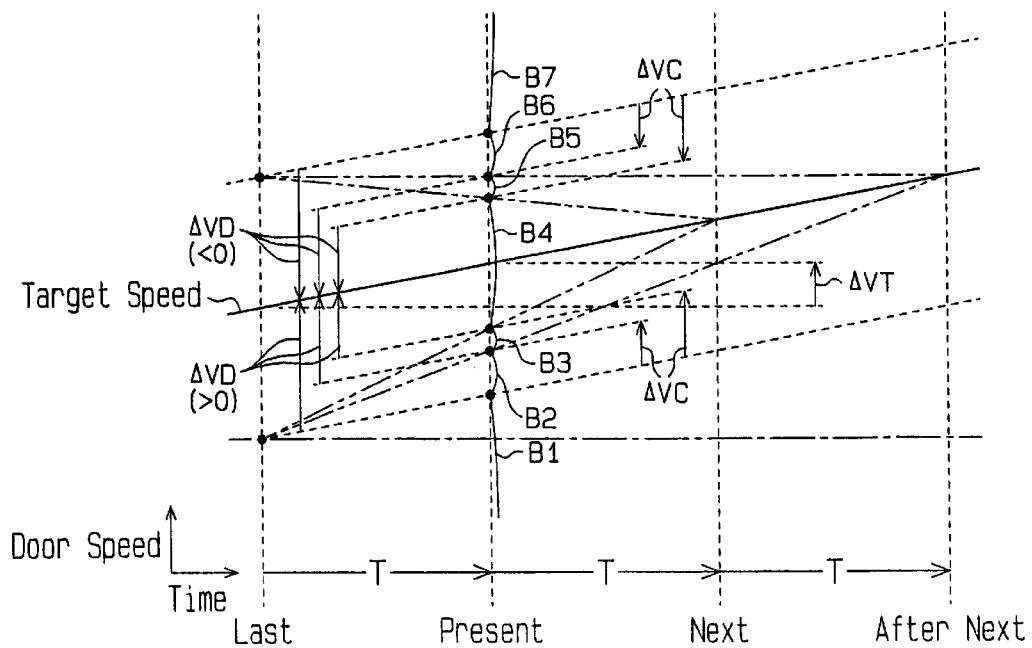
FIG. 8 is an explanatory view showing the relationship between the speed differences, speed changing amount and increasing value/decreasing value under an acceleration condition of the opening/closing body.
Figure 9:
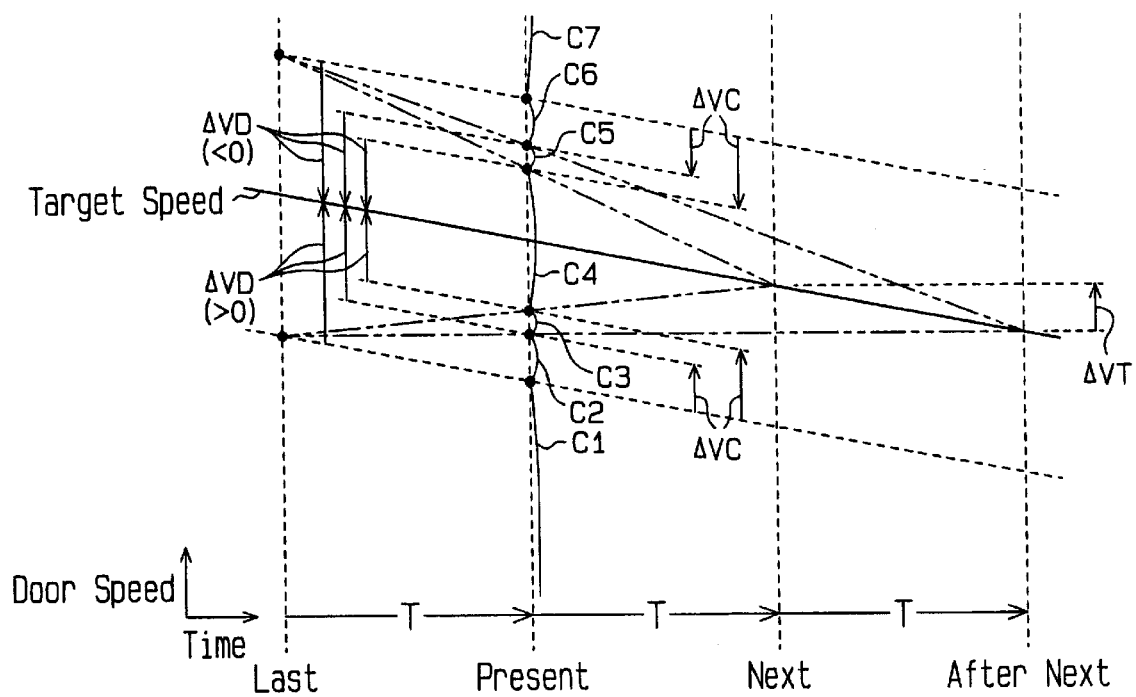
FIG. 9 is an explanatory view showing the relationship between the speed differences, speed changing amount and increasing value/decreasing value under a deceleration condition of the opening/closing body.

As shown in FIG. 8, when the speed difference ΔVD is the positive value, the door speed is within a range B1 in which the value obtained by subtracting a changing amount ΔVT per detecting time T of the target speed from the calculated acceleration/deceleration value (>0) ΔVC is less than zero (i.e., ((ΔVC−ΔVT)<0), the acceleration increasing value (such as the acceleration value under the acceleration condition) ΔIA1 is used. That is, the increasing value ΔIA1 is set such that the speed difference between the target door speed and the actual door speed at the next process timing is smaller than the speed difference between the target door speed and the actual door speed at the present time.

[ΔIA2]

As shown in FIG. 8, when the speed difference ΔVD is a positive value and two times the value obtained by subtracting the changing amount ΔVT from the calculated acceleration/deceleration value ΔVC is less than the speed difference ΔVD between the actual door speed and the target door speed, and the door speed is within the range B2 in which the value obtained by subtracting the changing amount ΔVT from the acceleration/deceleration value ΔVC is more than zero, the acceleration increasing value ΔIA2 is used. The increasing value ΔIA2 is set such that the speed difference between the target door speed and the actual door speed based at the next process timing is smaller than the speed difference between the target door speed and the actual door speed at the present process timing.

[ΔIA3]

As shown in FIG. 8, when the speed difference ΔVD is a positive value and the value obtained by subtracting the changing amount ΔVT from the calculated acceleration/deceleration value ΔVC is less than the speed difference ΔVD, and the door speed is within the range B3 in which two times the value obtained by subtracting the changing amount ΔVT from the acceleration/deceleration value ΔVC is more than the speed difference ΔVD, the acceleration increasing value ΔIA3 is used. The increasing value ΔIA3 is set such that the speed difference between the target door speed and the actual door speed at the next process timing is smaller than the speed difference between the target door speed and the actual door speed at the present process timing.

Further, when the speed difference ΔVD is a positive value, the value obtained by subtracting the changing amount ΔVT from the calculated acceleration/deceleration value ΔVC is greater than the speed difference ΔVD, or the speed reference ΔVD is a negative value, the target speed and the door speed is within a range B4 in which the value obtained by subtracting the changing amount ΔVT from the calculated acceleration/deceleration value ΔVC is less than the speed difference ΔVD, the acceleration increasing values ΔIA1–ΔIA3 and the acceleration decreasing values ΔDA1–ΔDA3 are not used. The actual door speed will approach the target door speed at the next process timing by the PWM duty command value set at the last process timing.

[ΔDA3]

On the other hand, as shown in FIG. 8, when the speed difference ΔVD is a negative value, the value obtained by subtracting the changing amount ΔVT from the calculated acceleration/deceleration value ΔVC is greater than the speed difference ΔVD ((ΔVC−ΔVT)>ΔVD), and the door speed is within a range B5 in which two times the value obtained by subtracting the changing amount ΔVT from the calculated acceleration/deceleration value ΔVC is less than the speed difference ΔVD ((2(ΔVC−ΔVT))<ΔVD), the acceleration decreasing value (such as the decreasing value under the deceleration condition) ΔDA3 is used. The acceleration decreasing value ΔDA3 is set to decrease the actual door speed at the next process timing below the target door speed at the present time and so as not to decrease the actual door speed at the next process timing below the target door speed at the next process timing.

[ΔDA2]

When the speed difference ΔVD is a negative value, two times the value obtained by subtracting the changing amount ΔVT from the calculated acceleration/deceleration value ΔVC is greater than the speed difference ΔVD, and the door speed is within a range B6 in which the obtained by subtracting the changing amount ΔVT from the calculated acceleration/deceleration value ΔVC is less than zero, the acceleration decreasing value ΔDA2 is used. The acceleration decreasing value ΔDA2 is set such that the actual door speed at the next process timing is smaller than the target door speed at the present time and so as not to decrease the actual door speed at the next process timing below the target door speed at the next process timing.

[ΔDA1]

Further, when the speed reference ΔVD is a negative value and the door speed is within a range B7 in which the value obtained by subtracting the changing amount ΔVT from the calculated acceleration/deceleration value ΔVC is more than zero, the acceleration decreasing value ΔDA1 is used. The acceleration decreasing value ΔDA1 is set such that the speed difference between the target door speed and the actual door speed at the next process timing is smaller than the speed difference between the target door speed and the actual door speed at the present process timing.

Deceleration

The three increasing values used for the deceleration condition under the close motion include the deceleration increasing values (such as increasing values under the deceleration condition) ΔID1, ΔID2, ΔID3, and the three decreasing values include the deceleration decreasing values (such as decreasing values under the deceleration condition) ΔDD1, ΔDD2, ΔDD3. The deceleration increasing values ΔID1, ΔID2, ΔID3 are addition or acceleration elements of the PWM duty command value for increasing the motor torque, the deceleration decreasing values ΔDD1, ΔDD2, ΔDD3 are subtraction or deceleration elements of the PWM duty command value for decreasing the motor torque.

The absolute value of the deceleration increasing values ΔID1, ΔID2, ΔID3 is same as the absolute value of the acceleration decreasing values ΔDA1, ΔDA2, ΔDA3 respectively set in the close side acceleration/deceleration area. Similarly, the absolute value of each of the deceleration decreasing values ΔDD1, ΔDD2, ΔDD3 is the same as the absolute value of the acceleration increasing values ΔIA1, ΔIA2, ΔIA3 respectively.

Each deceleration increasing value ΔID1, ΔID2, ΔID3 used for the deceleration condition under the close motion and each deceleration decreasing value ΔDD1, ΔDD2, ΔDD3 is selected based on the speed difference ΔVD, the. acceleration/deceleration value ΔVC, and the moving direction, with the abovementioned values being set in the motor torque setting process.

Open Side Acceleration/Deceleration Area

As shown in FIG. 6, for the open side acceleration/deceleration area much the same as in the close side acceleration/deceleration area, three deceleration increasing values ΔID1–ΔID3 and three deceleration decreasing values ΔDD1–ΔDD3 are set, with each of the deceleration increasing values and each of the deceleration decreasing values having absolute values differing from each other. These values are used for the open motion of the slide door D. Further, three acceleration increasing values ΔIA1–ΔIA3 and three acceleration decreasing values ΔDA1–ΔDA3 are set, with each of the acceleration increasing values and each of the acceleration decreasing values having absolute values differing from each other. These values are used for the close motion of the slide door D. The deceleration increasing values ΔID1–ΔID3 and the deceleration decreasing values ΔDD1–ΔDD3 are the same as the respective increasing values and decreasing values used on the deceleration in the close side acceleration/deceleration area. The acceleration increasing values ΔIA1–ΔIA3 and the acceleration decreasing values ΔDA1–ΔDA3 are the same as the respective increasing values and decreasing values used in the acceleration (e.g. ΔIA1=ΔDD1, ΔIA2=ΔDD2, ΔIA3=ΔDD3, ΔDA1=ΔID1, ΔDA2=ΔID2, ΔDA3=ΔID3).

The deceleration increasing values ΔID1–ΔID3 and the deceleration decreasing values ΔDD1–ΔDD3 are selected similarly under the deceleration condition in the open side acceleration/deceleration area, with the selected value being set for the PWM duty command value. Further, the acceleration increasing values ΔIA1–ΔIA3 and the acceleration decreasing values ΔDA1–ΔDA3 are selected similarly under the acceleration condition in the open side acceleration/deceleration area, with the selected value being set for the PWM duty command value.

Overload Judging Process

Figure 10:
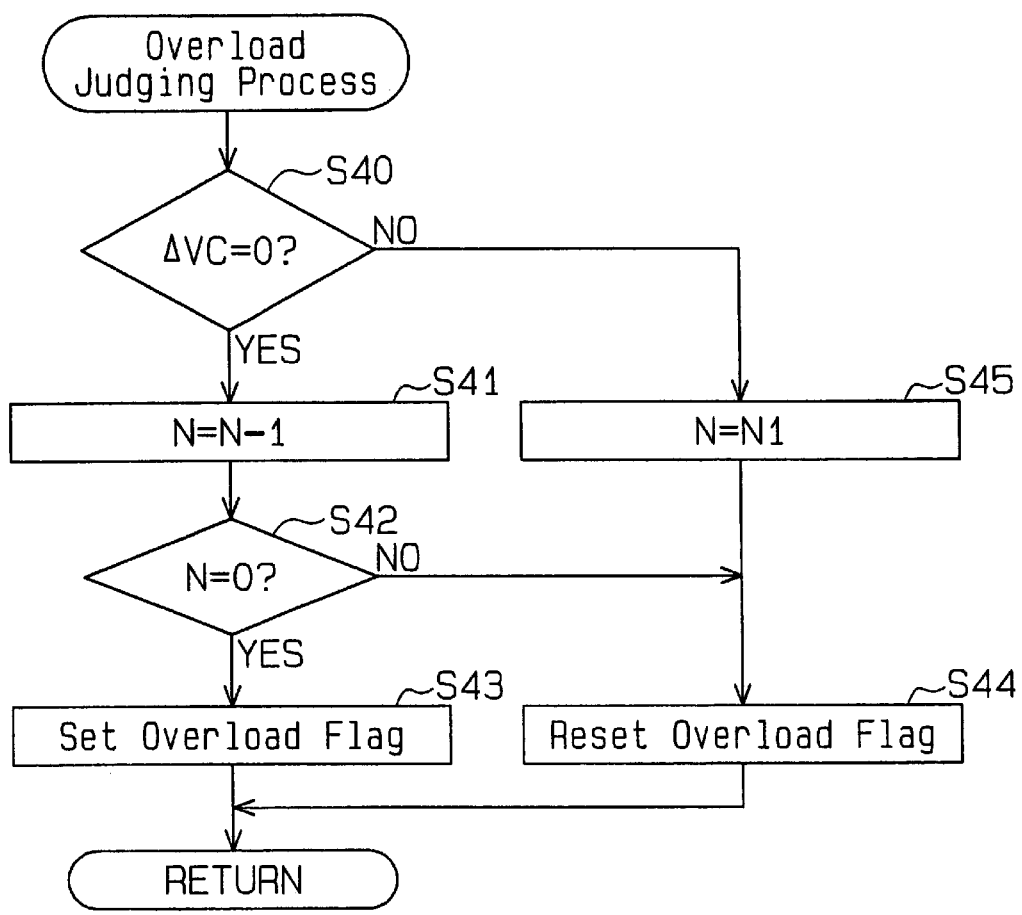
FIG. 10 is a flowchart of the overload judging process performed in the routine shown in FIG. 4.

FIG. 10 illustrates the overload judging process executed in step S14 of FIG. 4. In step S40 of FIG. 10, the microcomputer 19 judges whether the acceleration/deceleration value ΔVC calculated in the motor torque setting process is zero. When the acceleration/deceleration value ΔVC is zero, a load judging value N set in the initialization is decremented at step S41. For example, the load judging value N1 in step S45 is set as 300.

Next, at step S42 the microcomputer 19 judges whether the count value N of the load counter is zero. When the count value N of the load counter is zero, the overload judging process is finished after the load judging flag is set at step S43. On the other hand, when it is determined at step S42 that the count value of the overload counter is not zero, the overload judging process is finished after the load judging flag is reset at step S44.

Further, when it is determined at step S40 that the acceleration/deceleration value is not zero, the overload judging process is finished after the load count value N of the load counter is set as the load judging value N1 at S45 and the overload flag is reset at S44.

According to the abovementioned overload judging process, depending the pulse signal P2 does not input in the microcomputer 19 while the automatically opening/closing control process is executed N1 times, new past time did not obtain by the door position/speed detecting process, the microcomputer 19 detects an overload, which is greater than a predetermined magnitude for the slide door D while the slide door D is moving in the opening/closing motion, by the abovementioned overload judging process. The overload judging process is executed regardless of the door position and the moving direction of the slide door D.

On the other hand, in the motor torque setting process, the acceleration duty increasing value ΔIA1 to be set when the door position is at the open side acceleration/deceleration area is set such as a magnitude which N1 times thereof is greater than the duty "100". Accordingly, when the slide door D is driven from the full close position under the open motion and the slide door D is fixed at the full close position by being frozen, the motor 15 is driven by the PWM duty value such as "100" at a timing before the overload flag is set in the overload judging process.

Motor Control Process

Figure 11:
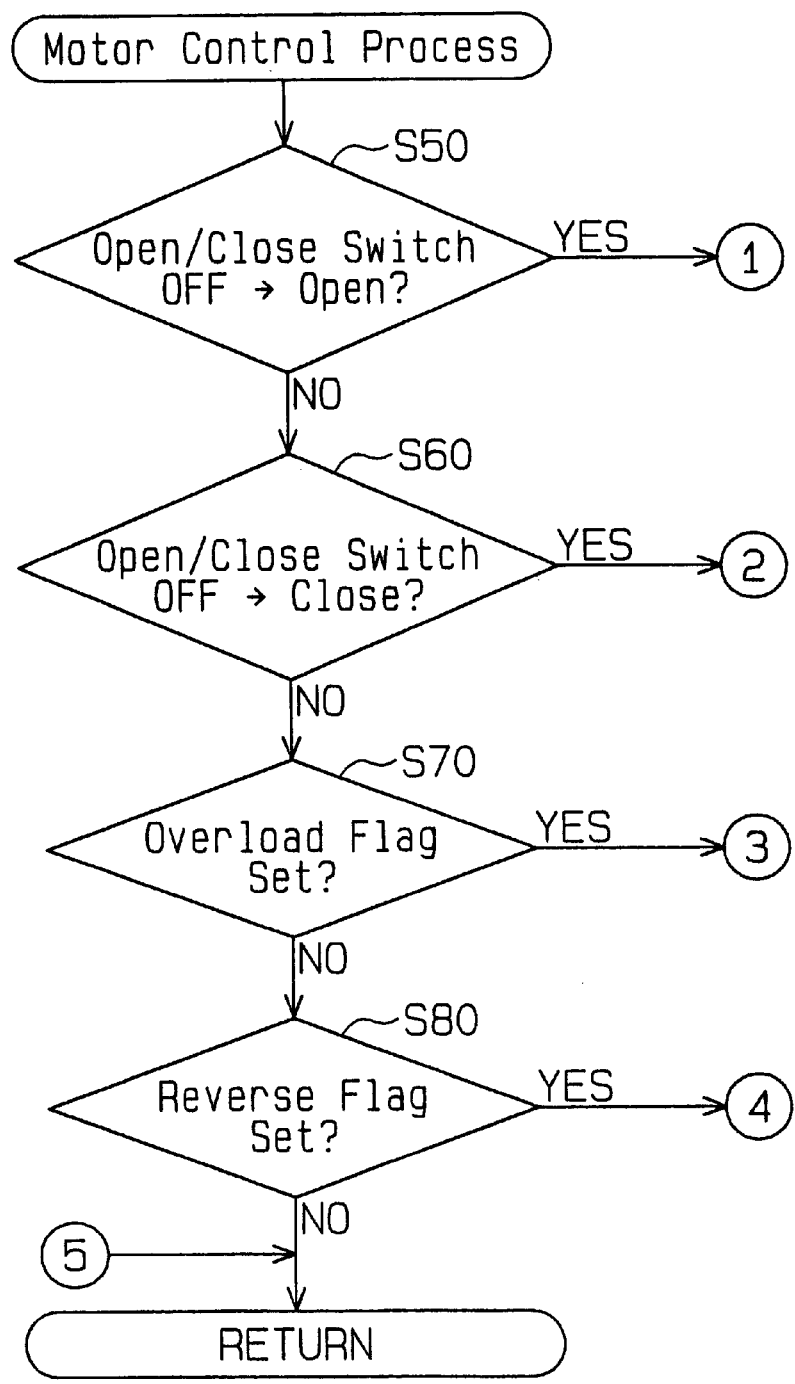
FIG. 11 is a flowchart of the motor control process performed in the routine shown in FIG. 4.
Figure 12:
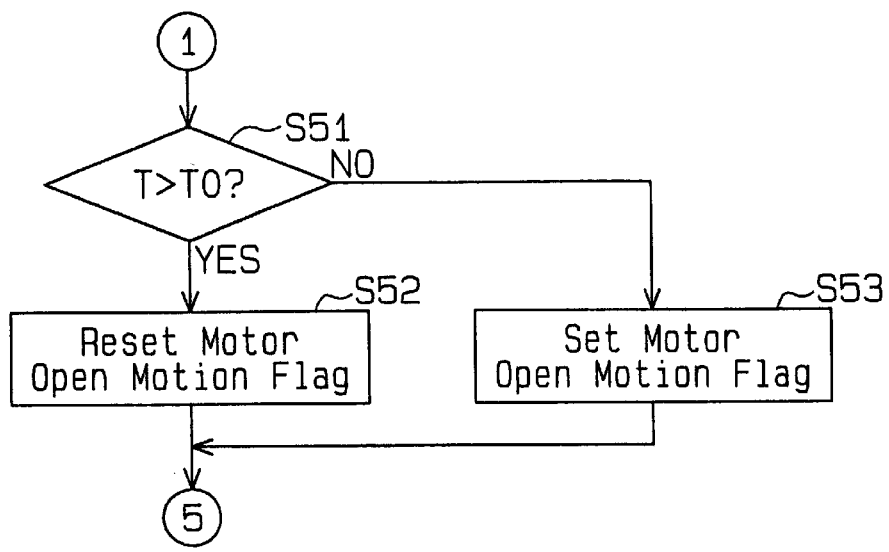
FIG. 12 is a flowchart showing another portion of the motor control process.

FIGS. 11–15 illustrate the motor control process executed at step S15 in the automatic opening/closing control process of FIG. 4. As shown in FIG. 11, the microcomputer 19 initially judges at step S50 whether the opening/closing switch 13 is operated from the OFF position to the open position (open condition). When the opening/closing switch 13 is operated from the OFF position to the open position, the program proceeds to step S51 in FIG. 12 where the microcomputer 19 judges whether or not a past time Tp obtained in the recent door position/speed detecting process has passed a predetermined operation limit time T0. When the past time Tp passes the operation limit time T0 at step S51, the motor control process is finished after the motor open motion flag is reset at step S52. When it is determined at step S51 that the past time Tp is not past the operation limit time T0, the motor control process is finished after the motor open motion flag is set at step S53.

According to the abovementioned processes, when the opening/closing switch 13 is operated by an open operation, the microcomputer 19 drives the motor 15, whereby the slide door D is moved under the open motion. The motor 15 is stopped when the slide door D reaches the full open position.

Figure 13:
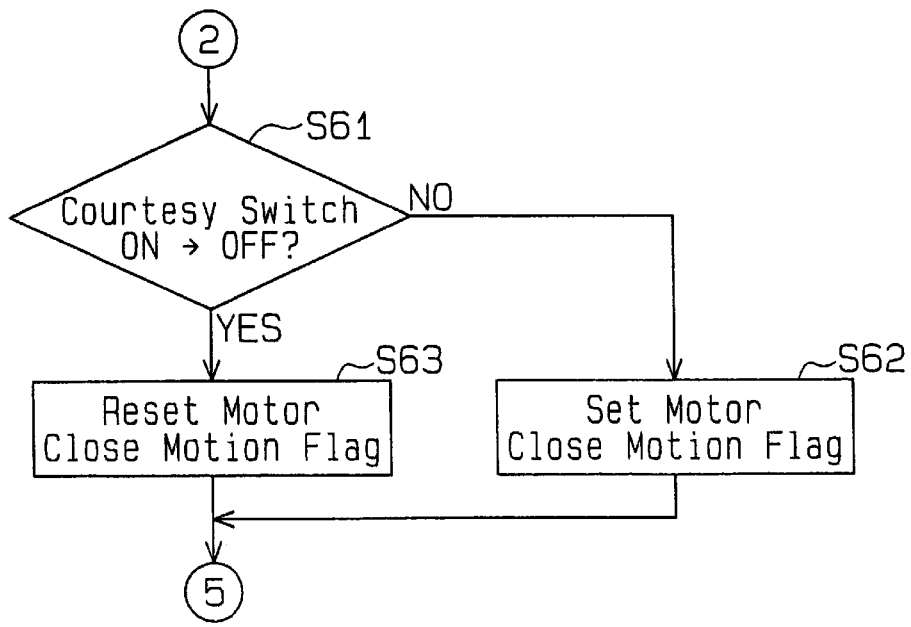
FIG. 13 is a flowchart showing another portion of the motor control process.

Further, as shown in FIG. 11, when it is determined at step S50 that the opening/closing switch 13 is not operated from the OFF position to the open position, the microcomputer 19 judges at step S60 whether or not the opening/closing switch 13 is operated from the OFF position to the close position. When the opening/closing switch 13 is operated from the OFF position to the close position at step S60, as shown in FIG. 13 the microcomputer 19 judges whether the courtesy switch 14 is switched from the ON condition to OFF condition at step S61. When the courtesy switch 14 has not switched from the ON condition to the OFF condition, the motor control process is finished after the motor close motion flag is set at step S62. When the courtesy switch 14 is switched from the ON condition to the OFF condition, the motor control process is finished after the motor close motion flag is reset at step S63.

According to the abovementioned process, when the opening/closing switch 13 is operated from the OFF condition to the close position, the microcomputer 19 drives the motor 15, whereby the slide door D is moved under the close motion, with the motor 15 being stopped when the slide door D reaches the full close position.

Figure 14:
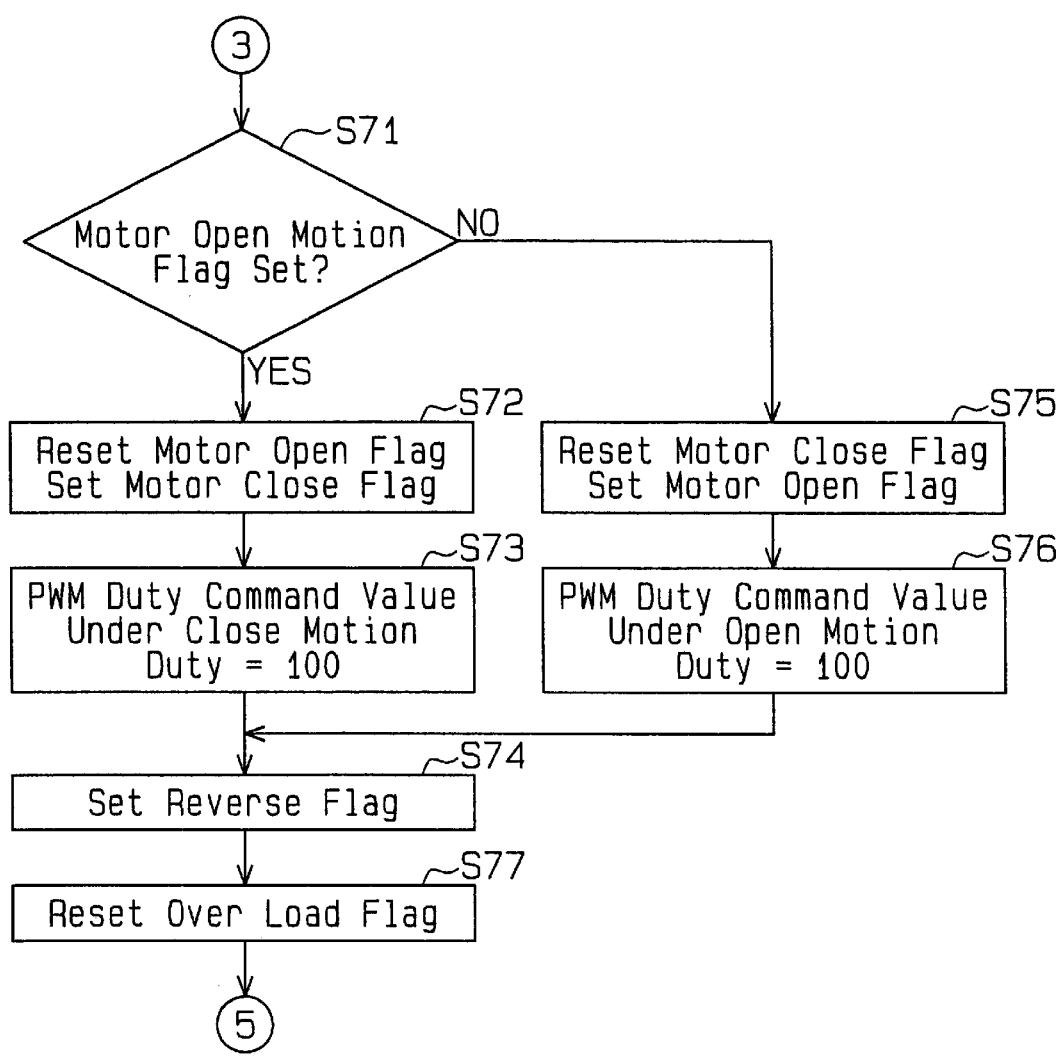
FIG. 14 is a flowchart showing another portion of the motor control process.

Further, as shown in FIG. 11, when the opening/closing switch 13 is not operated from the OFF condition to the close position, the microcomputer 19 judges whether or not the overload flag is set at step S70. When the overload flag is set at step S70, as shown in FIG. 14 the microcomputer 19 judges whether or not the motor open motion flag is set at step S71.

When the motor open motion flag is set at step S71, the motor open motion flag is reset and the motor close flag is set at step S72, the PWM duty command value under the close motion is set as "100", and the microcomputer 19 executes step S74.

On the other hand, when the motor open operation flag is not set at step S71, the motor close flag is reset and the motor open flag is set at step S75, the PWM duty command value under the open motion is set as "100" at step S76, and the microcomputer 19 executes step S74.

After the reverse flag is set at step S74, the overload flag is reset at step S77 and the motor control process is finished.

Figure 15:
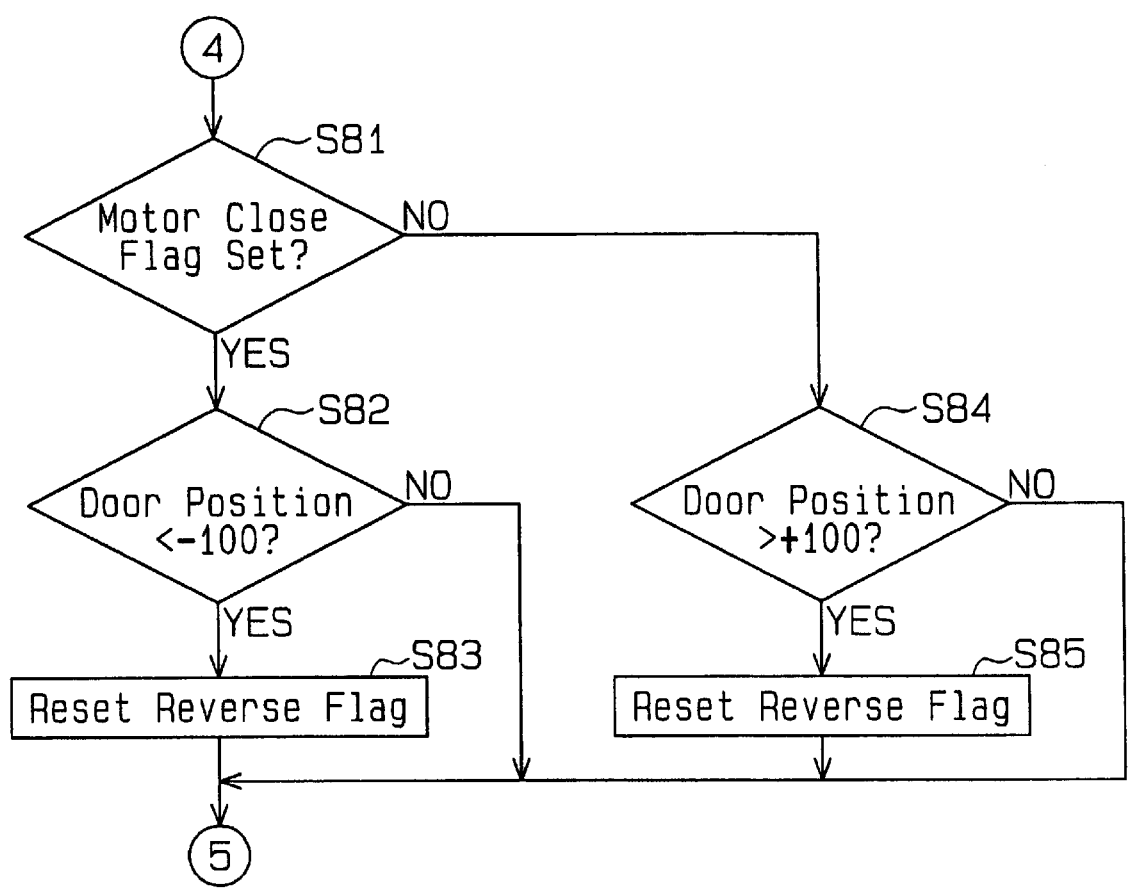
FIG. 15 is a flowchart showing another portion of the motor control process.

According to the above mentioned overload process, when the overload acts on the slide door D under the opening/closing motion, the microcomputer 19 drives the slide door D with a maximum speed in a reverse direction Further, as shown in FIG. 11, when the overload flag is not set at step S70, the microcomputer 19 judges at step S80 whether or not the reverse flag is set. When the reverse flag is set at step S80, as shown in FIG. 15 the microcomputer 19 judges whether or not the motor close operation flag is set at step S81.

When the motor close operation flag is set, the microcomputer 19 judges whether the slide door D moved from a reverse starting position to 100 mm to the close direction based on the count value of the position counter at step S82. When the side door D moved from the reverse starting position to 100 mm to the close direction at step S82, the motor control process is finished after the reverse flag is reset at step S83 and when the door position does not move from the reverse starting position to 100 mm in the reverse direction at step S82, the microcomputer 19 does nothing and the motor control process is finished.

On the other hand, when the motor close operation flag is not set at step S81, the microcomputer 19 judges at step S84 whether or not the slide door D has moved from the reverse starting position. When the slide door D has moved from the reverse starting position to 100 mm in the open direction at step S84, the reverse flag is reset at step S85, and the motor control process is finished. When the slide door D has not moved from the reverse starting position to 100 mm in the open direction at step S84, the reverse flag is reset at step S85, the microcomputer 19 does not do anything, and the motor control process is finished.

According to the abovementioned process, after the slide door D moved from the door position started the reverse motion to 100 mm by the maximum speed in the reverse motion, the motor is driven by the PWM duty command value to be set in the motor torque setting process.

According to the apparatus described here, depending on the speed difference ΔVD obtained by subtracting the actual door speed at the present process timing from the target speed, and the acceleration/deceleration value ΔVC between the present actual door speed and the last actual door speed by the detecting time T, the actual door speed after the detecting time T is adjusted by the PWM duty command value so as to approach the target speed. Therefore, even if the magnitude of the load acting on the slide door D changes by the opening/closing motion, or even if target speed is set so as to change according to the door position, the actual door speed is controlled by a small delay for the target speed at the door position.

In the close side acceleration/deceleration area under the open motion and the open side acceleration/deceleration area under the close motion, the PWM duty command value is adjusted by the acceleration increasing values ΔIA1–ΔIA3 and the acceleration decreasing values ΔDA1–ΔDA3 which are less than the respective acceleration increasing values ΔIA1–ΔIA3. On the other hand, in the close side acceleration/deceleration area under the close motion and the open side acceleration/deceleration area under the open motion, the PWM duty command value is adjusted by the deceleration increasing values ΔID1–ΔID3 and the deceleration decreasing values ΔDD1–ΔDD3 which are greater than the respective deceleration increasing values ΔID1–ΔID3. Therefore, in a manner similar to the constant speed area, as the PWM duty command value is not adjusted by each increasing/decreasing value to be set the same magnitude differ from each other in the acceleration/deceleration area, in the open side acceleration/deceleration area and the close side acceleration/deceleration area in which the target speed changes, the actual door speed is controlled by a small delay for the target speed.

During the open motion of the slide door D, in the deceleration in the open side acceleration/deceleration area which happens an entrapment of obstacles and the deceleration in the close side acceleration/deceleration area which the entrapment is caused by the close motion, the increasing value ΔID1–ID3 is set at a value which is smaller than the respective decreasing value ΔDD1–ΔDD3. Therefore, when entrapment of an object occurs and the door speed drops from the target speed, the PWM duty command value does not suddenly change by a large value. Accordingly, a load generated by the slide door D entrapping an obstacle can be reduced.

When a large load acts on the slide door D on the overload judging process, the motor 15 is driven in the reverse direction, in this case the PWM duty value is "100". Therefore, when overload by entrapment of an obstacle during the movement of the slide door D acts on the obstacle, a time affecting by an entrapped force for a obstacle side from the slide door D can be shortened. As a result, when the slide door D is moving under the close motion, and a person is entrapped between the opening E and the slide door D, the entrapped time can be shortened so that pain caused by the entrapment force for the person can be reduced.

When the slide door D is fixed by freezing at the full close position, the motor 15 is driven at the PWM duty value such as "100" before the microcomputer 19 judges the overload condition. Thereby, for example, even if the slide door D is frozen and the slide door D is in a fixed condition, the slide door D can be reliably moved under the open motion automatically.

Even if the slide door D is heavy, the slide door D of which a torque is largely changed by the degree of inclination in the front/rear direction of the vehicle is controlled by a small delay for the target torque.

Other embodiments, aspects and variations may be employed in connection with the embodiment described above. When the door position detected in the door position/speed detecting process at pleasure changes every predetermined detecting distance, a speed difference for the target speed at the door position and an acceleration/deceleration value between the door speed at the last door position and the door speed at the present door position are calculated. So it may be a construction of which the duty increasing value and the duty decreasing value is set based on the speed difference and the acceleration/deceleration value. In this case, the door speed is controlled by a small delay for the target speed.

In the close side and open side acceleration/deceleration area, each increasing value is equal to the decreasing value to be set under the acceleration/deceleration condition. When the slide door D is under the acceleration condition and the door speed detected at every past detecting time T is over the target speed repeats a predetermined times successively, the microcomputer 19 subtracts the duty decreasing value from the PWM duty command value for the first time. Similarly, when the slide door D is under the deceleration condition, the detected door speed is below the target speed repeats a predetermined number of times successively, the microcomputer 19 adds the PWM duty command value to the duty increasing value for the first time. In this case, it prevents the actual door speed from falling widely below the target speed under the acceleration condition, and it prevents the actual door speed from widely increasing over the target speed under the deceleration condition. The door speed is thus controlled by a small delay in the acceleration/deceleration area changing the target speed.

The increasing value used for the acceleration condition and the deceleration value used for the deceleration condition can only be set in the close side acceleration/deceleration area and the open side acceleration/deceleration area. Further, when the actual door speed is below the target door speed under the acceleration condition, the microcomputer 19 adds the PWM duty command value to the increasing value, and when the actual door speed is above the target door speed under the deceleration condition, the microcomputer 19 subtracts the decreasing value from the PWM duty command value, and when the door speed is below the target speed, the PWM duty command value is maintained. In this case, it prevents the door speed from falling widely below the target speed under the acceleration condition, and the door speed is controlled by a small delay in the acceleration/deceleration area changing the target speed.

The increasing value and decreasing value based on the speed difference and the acceleration/deceleration value may be set continuously in the constant speed area or each acceleration/deceleration area. In this case, the door speed is controlled by smaller delay for the target speed.

An area where a sliding resistance is large when the slide door D positioning at the full close position moves from a rim of the opening E to the outside of the vehicle is sectionalized as a large load area. For the large load area, each increasing value and decreasing value more than each increasing value and decreasing value to be set for the close side acceleration/deceleration area except the large load area are set. In this case, for the large load area, it differs from when each increasing value and decreasing value as same wide as an area of the close side acceleration/deceleration area except the large load area is set, a changing amount from the target speed of the door speed in the large load area is larger than a changing amount from the target speed in the remains area. Accordingly, even if the sliding resistance is variable depending on the door position, the door speed is controlled by a smaller delay in all of the opening/closing area.

The opening/closing body mounted on the vehicle is not limited to the slide door D, and the opening/closing body may be, for example, a slide roof or a slide window.

The opening/closing body is a slide door opening/closing for the opening formed at a side portion of the vehicle. According to this construction, even if the slide door D is heavy and large, if the demand torque for the motor by the degree of inclination in the front/rear direction of the vehicle widely changes, it is possible to control the slide door D by a small delay for the target speed.

The opening/closing body is a slide door opening/closing for the opening mounted on a side portion of the vehicle. According to this construction, the slide door D which is heavy and large, and a torque demand for the motor by the inclination condition in the longitudinal direction of the vehicle is controlled by a small delay for the target speed.

According to the disclosed embodiment of the apparatus the moving speed of the opening/closing body is detected at every predetermined detecting time, or the moving speed of the opening/closing body is detected at every predetermined detecting distance moved the opening/closing body. Also, the motion speed detecting means detects the motion speed of the opening/closing body at every predetermined detecting time, or the motion speed detecting means detects at every predetermined detecting distance moved the opening/closing body.

Also, in the opening/closing control method and the opening/closing control apparatus of the opening/closing body in which the opening/closing speed of the opening/closing body is controlled by the target speed depending on the opening/closing position, even if the load acting on the opening/closing body or the target speed by a change of the opening/closing position of the opening/closing body changes, it is possible to control the slide door D by a small delay for the target speed at that time.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening/closing control method of an opening/closing body for a vehicle involving detecting a position of the opening/closing body within an opening/closing area, moving the opening/closing body and a motion speed of the opening/closing body based on a position of the opening/closing body, obtaining a predetermined target speed of the opening/closing body, controlling a feeding value for a motor moving the opening/closing body based on actual speed and the target speed, driving the motor by a torque depend on the feeding amount, the method comprising:

calculating a speed difference between the actual speed and the target speed for the position of the opening/closing body at every predetermined detecting time of the motion speed;

calculating an acceleration/deceleration value of a speed difference between a last detected motion speed and a present detected motion speed;

setting a feeding amount increasing/decreasing value for changing the torque of the motor based on at least the speed difference and the acceleration/deceleration value; and controlling the motor by a torque depending on one of a feeding value added the feeding amount increasing/decreasing value to a last obtained feeding value and a feeding value subtracted the feeding amount increasing/decreasing value from the last obtained feeding value.

2. An opening/closing control apparatus of an opening/closing body for a vehicle comprising:

motor operating means for operating a motor driving the opening/closing body by a torque depending on a feeding amount;

position detecting means for detecting a position of the opening/closing body within an opening/closing area moving of the opening/closing body;

target speed memory means for memorizing a target speed of the opening/closing body to be set at the position of the opening/closing body within the opening/closing area;

motion speed detecting means for detecting a motion speed of the opening/closing body;

speed difference obtaining means for calculating the difference between the target speed at the position of the opening/closing body and the motion speed at every detecting time of the motion speed;

acceleration/deceleration value obtaining means for calculating the acceleration/deceleration value such as a speed difference between the last detected motion speed and the present detected motion speed;

feeding amount increasing/decreasing value setting means for setting a feeding increasing/decreasing value changing the torque of the motor based on the speed difference and the acceleration/deceleration value; and motor control means for controlling the motor by one of a feeding value added the feeding increasing/decreasing value to a last obtained feeding value and a feeding value subtracted the feeding increasing/decreasing value from the last obtained feeding value.

3. The opening/closing control apparatus of an opening/closing body for a vehicle according to claim 2, further comprising:

moving direction detecting means for detecting a moving direction of the opening/closing body;

the feeding increasing/decreasing value setting means setting the feeding increasing/decreasing value based on the speed difference, the acceleration/deceleration value and the motion direction when the positions of the opening/closing body is in an acceleration/deceleration area where the target speed is increased/decreased depending on a change of the position of the opening/closing body.

4. The opening/closing control apparatus of an opening/closing body for a vehicle according to claim 3, wherein the feeding increasing/decreasing value setting means sets an increasing value from a sum of plural feeding increasing/decreasing values to be predetermined set in the acceleration/deceleration area when the moving direction of the opening/closing body is a direction increasing the target speed in the acceleration/deceleration area, and sets an decreasing value from a sum of plural feeding increasing/decreasing values to be predetermined set in the acceleration/deceleration area when the moving direction of the opening/closing body is a direction decreasing the target speed in the acceleration/deceleration area.

5. The opening/closing control apparatus of an opening/closing body for a vehicle according to claim 2, wherein the feeding increasing/decreasing value setting means sets such that each sum of the increasing value and the decreasing value of plural feeding increasing/decreasing values to be predetermined set in a large load area is larger than each sum of the increasing value and the decreasing value of plural feeding increasing/decreasing values to be predetermined set in an area except the large load area when the position of the opening/closing body is in a large load area where a load resistance by a moving of the opening/closing body is large.

6. The opening/closing control apparatus of an opening/closing body for a vehicle according to claim 2, further comprising:

overload detecting means for detecting whether the load resistance against the opening/closing body is more than a predetermined load judging value; and reverse control means for controlling the motor by a predetermined overload feeding amount when the load resistance is more than the load judging value, and moving the opening/closing body in a reverse direction.

* * * * *